(12) United States Patent  
Wang et al.

(10) Patent No.: US 8,395,353 B2  
(45) Date of Patent: Mar. 12, 2013

(54) WIRELESS CHARGING TRANSMITTER FOR PORTABLE ELECTRONIC DEVICE

(75) Inventors: Jong-Ding Wang, Taipei (TW); Yen-Wei Lee, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 333 days.

(21) Appl. No.: 12/984,408

(22) Filed: Jan. 4, 2011

(65) Prior Publication Data

US 2012/0169276 A1     Jul. 5, 2012

(51) Int. Cl.
*H01M 10/46*     (2006.01)
(52) U.S. Cl. ............................................. 320/108
(58) Field of Classification Search .......... 320/107, 320/108, 112, 114, 115; 336/DIG. 2
See application file for complete search history.

(56) References Cited

U.S. PATENT DOCUMENTS

| | | | |
|---|---|---|---|
| 7,065,658 B1* | 6/2006 | Baraban et al. | 320/108 |
| 8,061,864 B2* | 11/2011 | Metcalf et al. | 320/107 |
| 2011/0018360 A1* | 1/2011 | Baarman et al. | 307/104 |

* cited by examiner

*Primary Examiner* — Edward Tso
(74) *Attorney, Agent, or Firm* — Kirton McConkie; Evan R. Witt

(57) ABSTRACT

A wireless charging transmitter for a portable electronic device is provided. The wireless charging transmitter includes a first housing, a second housing and a wireless charge transmitting module. The wireless charge transmitting module is disposed within the second housing. The second housing is rotatable with respect to the first housing, so that either an included angle is defined between the second housing and the first housing or the second housing and the first housing are folded together. Whereas, in a case that an included angle is defined between the second housing and the first housing, once a wireless charging receiver is contacted with the second housing, electric power may be transmitted to the wireless charging receiver. In a case that the second housing and the first housing are folded together, the wireless charging transmitter has a rectangular shape. Due to the rectangular shape, the wireless charging transmitter is easily carried.

11 Claims, 7 Drawing Sheets

WIRELESS CHARGING TRANSMITTER FOR PORTABLE ELECTRONIC DEVICE

FIELD OF THE INVENTION

The present invention relates to a wireless charging transmitter, and more particularly to a wireless charging transmitter for a portable electronic device.

BACKGROUND OF THE INVENTION

With increasing development of science and technology, a variety of electronic devices are development toward small size, light weightiness and easy portability in order to comply with the users' requirements. Consequently, various portable electronic devices are produced by the manufacturers of the electronic devices. The common portable electronic devices include for example mobile phones, personal digital assistants (PDAs), handheld game consoles (e.g. PSP, NDSL and Gameboy series game consoles), and the like.

Due to the portability of the portable electronic device, the portable electronic device fails to be connected with the power source at any time. For providing electric power required for powering the portable electronic device, a built-in battery is usually installed in the portable electronic device. The battery is a chargeable battery. Once a power source is available, the chargeable battery of the portable electronic device may be charged by the power source as required.

For example, in a case that the residual battery capacity of the portable electronic device is insufficient, the chargeable battery of the portable electronic device may be charged by a charger. As known, conventional charger has a connecting wire. After the connecting wire is plugged in the portable electronic device and the conventional charger is connected with the power source, electric power may be transmitted from the charger to the portable electronic device through the connecting wire. However, the applications of the charger are usually restricted by the connecting wire. For example, during the process of charging the portable electronic device, the connecting wire usually becomes hindrance from operating the charger.

Recently, with development of a wireless charging technology, a wireless charging device for wirelessly charging the portable electronic device is disclosed. The conventional wireless charging device comprises a first induction coil and a second induction coil. The first induction coil is disposed within the wireless charging device and used as a wireless charge transmission module for transmitting electric power. The second induction coil is connected with a chargeable battery and used as a wireless charge receiving module for receiving electric power. When the wireless charge transmission module (i.e. the first induction coil) within the wireless charging device creates an alternating electromagnetic field, the wireless charge receiving module (i.e. the second induction coil) takes power from the electromagnetic field and converts the power into an electric current. The electric current is transmitted to the chargeable battery to charge the chargeable battery.

However, up to now, the wireless charging technology has not been well established. In addition, it is still a challenge to introduce the wireless charging product into the market. For example, the connecting relationship between the wireless charge transmission module and the wireless charge receiving module and the connecting relationship between the wireless charge receiving module and the portable electronic device should be taken into consideration.

SUMMARY OF THE INVENTION

The present invention provides a wireless charging transmitter for a portable electronic device in order to transmit electric power to a wireless charge receiving module of the portable electronic device.

In accordance with an aspect of the present invention, there is provided a wireless charging transmitter for a portable electronic device. The wireless charging transmitter is configured to transmit first electric power to a wireless charging receiver holding the portable electronic device. The wireless charging transmitter includes a first housing, a second housing and a first wireless charge transmitting module. The second housing is connected with the first housing and rotatable with respect to the first housing, so that either an included angle is defined between the second housing and the first housing or the second housing and the first housing are folded together. The second housing is contactable with the wireless charging receiver. The first wireless charge transmitting module is installed within the second housing. When the wireless charging receiver is contacted with the second housing, the first electric power is transmitted from the first wireless charge transmitting module to the wireless charging receiver.

In an embodiment, the wireless charging transmitter further includes a wireless charge receiving seat for fixing a wirelessly-chargeable electronic device. When the wireless charge receiving seat is contacted with the first housing or the second housing, the first electric power from the first wireless charge transmitting module is received by the wireless charge receiving seat and transmitted to the wirelessly-chargeable electronic device, or second electric power from a second wireless charge transmitting module is received by the wireless charge receiving seat and transmitted to the wirelessly-chargeable electronic device.

In an embodiment, the second wireless charge transmitting module is installed within the first housing. When the wireless charge receiving seat is contacted with the first housing, the second electric power is transmitted from the second wireless charge transmitting module to the wireless charge receiving seat.

In an embodiment, the wireless charge receiving seat has an insertion slot. When a terminal of the wirelessly-chargeable electronic device is inserted into the insertion slot, the wirelessly-chargeable electronic device is fixed in the insertion slot and the wireless charge receiving seat is contacted with the wirelessly-chargeable electronic device, so that the second electric power is transmitted to the wirelessly-chargeable electronic device.

In an embodiment, the second wireless charge transmitting module is installed within the second housing. When the wireless charge receiving seat is contacted with the second housing, the second electric power is transmitted from the second wireless charge transmitting module to the wireless charge receiving seat.

In an embodiment, the first housing further includes a receptacle for accommodating the wireless charge receiving seat. When the second housing and the first housing are folded together by rotating the second housing with respect to the first housing, the receptacle is sheltered by the second housing and the receptacle is not exposed outside the first housing.

In an embodiment, the first housing further includes a connecting wire and a wire-receiving part. The connecting wire is connected with a power source for transmitting the first electric power from the power source to the first wireless charge transmitting module. The wire-receiving part is formed in a sidewall of the first housing for accommodating the connecting wire.

In an embodiment, the second housing further includes a receptacle, which is formed in a surface of the second housing for accommodating the wireless charging receiver. The first housing further includes an insertion slot, which is formed in a sidewall of the first housing. When a terminal of a wirelessly-chargeable electronic device is inserted into the insertion slot, the wirelessly-chargeable electronic device is fixed in the insertion slot.

In accordance with another aspect of the present invention, there is provided a wireless charging transmitter for a portable electronic device. The wireless charging transmitter is configured to transmit first electric power to a wireless charging receiver holding the portable electronic device. The wireless charging transmitter includes a housing, a supporting stand and a first wireless charge transmitting module. The housing is contactable with the wireless charging receiver. The supporting stand is connected with the housing and rotatable with respect to the housing, so that either an included angle is defined between the supporting stand and the housing or the supporting stand and the housing are folded together. The first wireless charge transmitting module is installed within the housing. When the wireless charging receiver is contacted with the housing, the first electric power is transmitted from the first wireless charge transmitting module to the wireless charging receiver.

In an embodiment, the housing further includes an insertion slot, which is formed in a sidewall of the housing. When a terminal of a wirelessly-chargeable electronic device is inserted into the insertion slot, the wirelessly-chargeable electronic device is fixed in the insertion slot and the wirelessly-chargeable electronic device is contacted with the first wireless charge transmitting module, so that the first electric power is transmitted from the first wireless charge transmitting module to the wirelessly-chargeable electronic device.

In an embodiment, the housing further includes an insertion slot and a second wireless charge transmitting module. The insertion slot is formed in a sidewall of the housing. When a terminal of a wirelessly-chargeable electronic device is inserted into the insertion slot, the wirelessly-chargeable electronic device is fixed in the insertion slot. The second wireless charge transmitting module is installed within the housing. When the wirelessly-chargeable electronic device is fixed in the insertion slot, the wirelessly-chargeable electronic device is contacted with the second wireless charge transmitting module, so that second electric power is transmitted from the second wireless charge transmitting module to the wirelessly-chargeable electronic device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a wireless charging transmitter for a portable electronic device.

Figure 1:
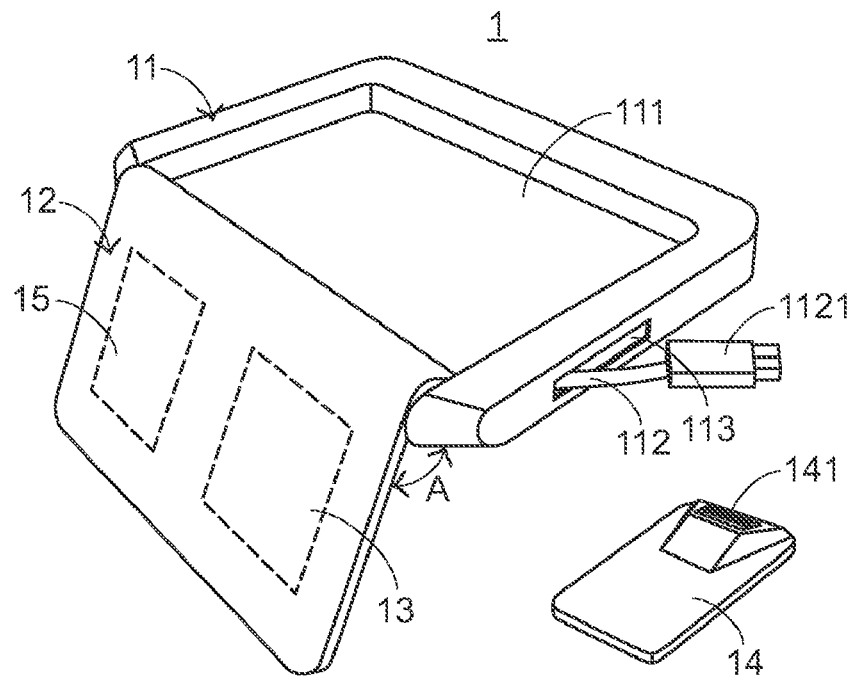
FIG. 1 is a schematic perspective view illustrating a wireless charging transmitter for a portable electronic device according to a first embodiment of the present invention, in which the wireless charging transmitter is in an unfolded status.

FIG. 1 is a schematic perspective view illustrating a wireless charging transmitter for a portable electronic device according to a first embodiment of the present invention, in which the wireless charging transmitter is in an unfolded status. As shown in FIG. 1, the wireless charging transmitter 1 comprises a first housing 11, a second housing 12, a first wireless charge transmitting module 13, a wireless charge receiving seat 14 and a second wireless charge transmitting module 15. The first housing 11 comprises a receptacle 111, a connecting wire 112 and a wire-receiving part 113. The wireless charge receiving seat 14 may be selectively accommodated within the receptacle 111. After the connecting wire 112 is connected with a power source (not shown), the electric power from the power source may be transmitted to the first wireless charge transmitting module 13 and the second wireless charge transmitting module 15 through the connecting wire 112. In addition, a connector 1121 is formed on a terminal of the connecting wire 112. In this embodiment, the connector 1121 is a universal series bus (USB) connector. The wire-receiving part 113 is formed in a sidewall of the first housing 11 for accommodating the connecting wire 112.

Please refer to FIG. 1 again. The second housing 12 is connected with the first housing 11 and rotatable with respect to the first housing 11. Consequently, an included angle A is defined between the second housing 12 and the first housing 11 (see FIG. 1), or the second housing 12 and the first housing 11 are folded together (see FIG. 2). The first wireless charge transmitting module 13 is installed within the second housing 12. In a case that a wireless charging receiver 3 holding a portable electronic device 2 is contacted with the second housing 12 (see FIG. 3), first electric power may be transmitted from the first wireless charge transmitting module 13 to the wireless charging receiver 3. The second wireless charge transmitting module 15 is also installed within the second housing 12. Similarly, in a case that the wireless charge receiving seat 14 is contacted with the second housing 12 (see FIG. 4), second electric power may be transmitted from the second wireless charge transmitting module 15 to the wireless charge receiving seat 14. Through the wireless charge receiving seat 14, a wirelessly-chargeable electronic device 4 may be wirelessly charged by the second electric power. Moreover, the wireless charge receiving seat 14 has an insertion slot 141. When a terminal of the wirelessly-chargeable electronic device 4 is inserted into the insertion slot 141, the wirelessly-chargeable electronic device 4 is fixed in the insertion slot 141. In this embodiment, the portable electronic device 2 is a mobile phone, and the wirelessly-chargeable electronic device 4 is a wireless headset. In this embodiment, each of the first wireless charge transmitting module 13 and the second wireless charge transmitting module 15 comprises an induction coil and a charging circuit. The operating principles of the induction coil and the charging circuit are well known in the art, and are not redundantly described herein. In some embodiment, the wirelessly-chargeable electronic device 4 is a wirelessly-chargeable flashlight, a wireless mouse, or the like.

Alternatively, in some embodiments, a single wireless charge transmitting module is installed in the second housing, but the other wireless charge transmitting module is not include in the second housing. The circuitry of the single wireless charge transmitting module is distinguished from the first wireless charge transmitting module 13. That is, the single wireless charge transmitting module is configured to simultaneously transmit the first electric power and the second electric power. The first electric power is transmitted to the wireless charging receiver; and the second electric power is transmitted to the wireless charge receiving seat. On the other hand, in the first embodiment, the first wireless charge transmitting module and the second wireless charge transmitting module are both included in the second housing.

Figure 2:
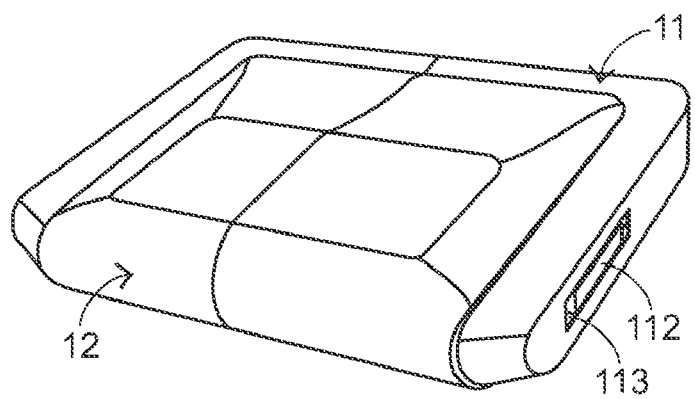
FIG. 2 is a schematic perspective view illustrating the wireless charging transmitter of FIG. 1, in which the wireless charging transmitter is in a folded status.

FIG. 2 is a schematic perspective view illustrating the wireless charging transmitter of FIG. 1, in which the wireless charging transmitter is in a folded status. In a case that the second housing 12 is rotated with respect to the first housing 11 and thus the second housing 12 and the first housing 11 are folded together, the receptacle 111 is sheltered by the second housing 12. Moreover, for facilitating the user to easily carry the wireless charging transmitter 1, the connecting wire 112 may be completely stored within the wire-receiving part 113, so that the wireless charging transmitter 1 has a rectangular shape. Moreover, before the first housing 11 are folded together, the wireless charge receiving seat 14 and/or some small articles may be accommodated within the receptacle 111. In such way, the wireless charge receiving seat 14 and/or some small articles can be stored within the wireless charging transmitter 1 without the need of being additionally held by the user's hands.

Figure 3:
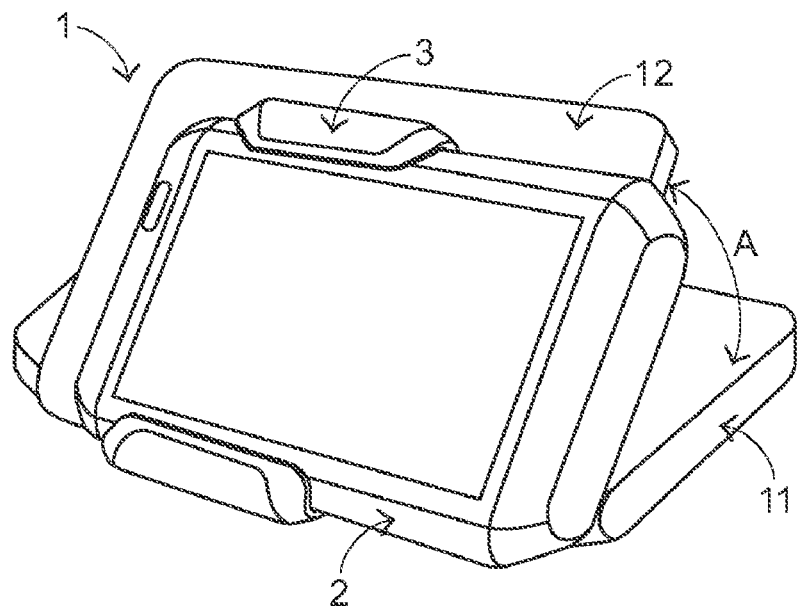
FIG. 3 is a schematic perspective view illustrating a system of transmitting electric power to the wireless charging receiver through the wireless charging transmitter according to the first embodiment of the present invention.
Figure 4:
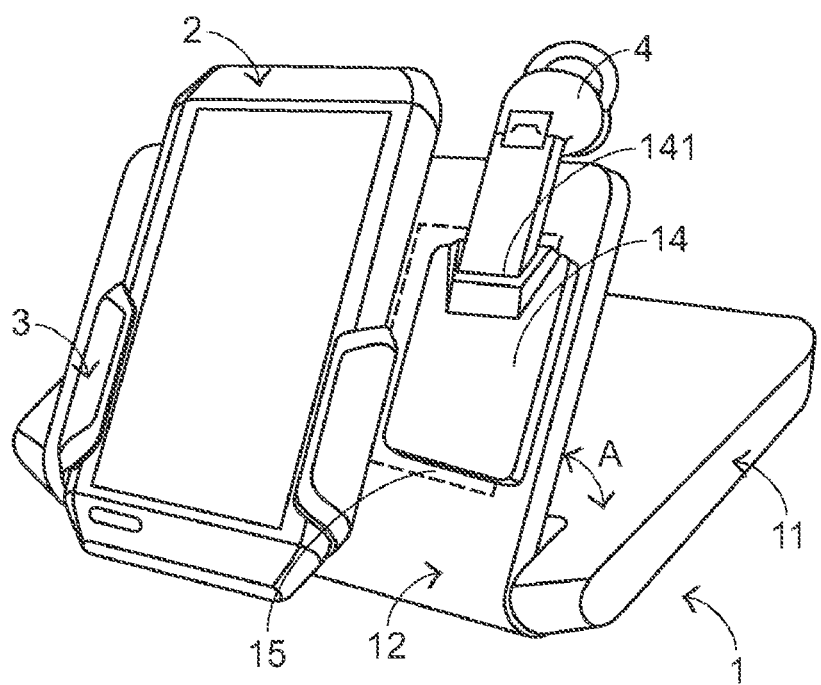
FIG. 4 is a schematic perspective view illustrating a system of simultaneously transmitting electric power to the wireless charging receiver and the wirelessly-chargeable electronic device through the wireless charging transmitter according to the first embodiment of the present invention.

Hereinafter, the use of the wireless charging transmitter 1 to transmit electric power to the portable electronic device 2 will be illustrated with reference to FIG. 3. FIG. 3 is a schematic perspective view illustrating a system of transmitting electric power to the wireless charging receiver through the wireless charging transmitter according to the first embodiment of the present invention. For wirelessly charging the portable electronic device 2, the second housing 12 is rotated with respect to the first housing 11 until the rotation of the second housing 12 is stopped by the first housing 11. Meanwhile, the included angle A between the second housing 12 and the first housing 11 is smaller than 90 degrees (i.e. an acute angle). In this situation, the wireless charging transmitter 1 may be used as a prop stand. Then, the wireless charging receiver 3 holding the portable electronic device 2 is contacted with the second housing 12. That is, the wireless charging receiver 3 is leaned against the second housing 12. In such way, the electric power may be transmitted from the first wireless charge transmitting module 13, which is installed within the second housing 12, to the wireless charging receiver 3 according to a wireless transmission technology. Then, the electric power is transmitted to the chargeable battery (not shown) of the portable electronic device 2 through the wireless charging receiver 3.

For simultaneously charging the portable electronic device 2 and the wirelessly-chargeable electronic device 4, a terminal of the wirelessly-chargeable electronic device 4 is inserted into the insertion slot 141 of the wireless charge receiving seat 14 to fix the wirelessly-chargeable electronic device 4 in the wireless charge receiving seat 14. Then, the wireless charging receiver 3 holding the portable electronic device 2 and the wireless charge receiving seat 14 holding the wirelessly-chargeable electronic device 4 are contacted with the prop-stand wireless charging receiver 3. That is, the wireless charging receiver 3 and the wireless charge receiving seat 14 are leaned against the second housing 12. In such way, the first electric power may be transmitted from the first wireless charge transmitting module 13, which is installed within the second housing 12, to the wireless charging receiver 3; and the second electric power may be transmitted from the second wireless charge transmitting module 15, which is also installed within the second housing 12, to the wirelessly-chargeable electronic device 4 (see FIG. 4).

Figure 5:
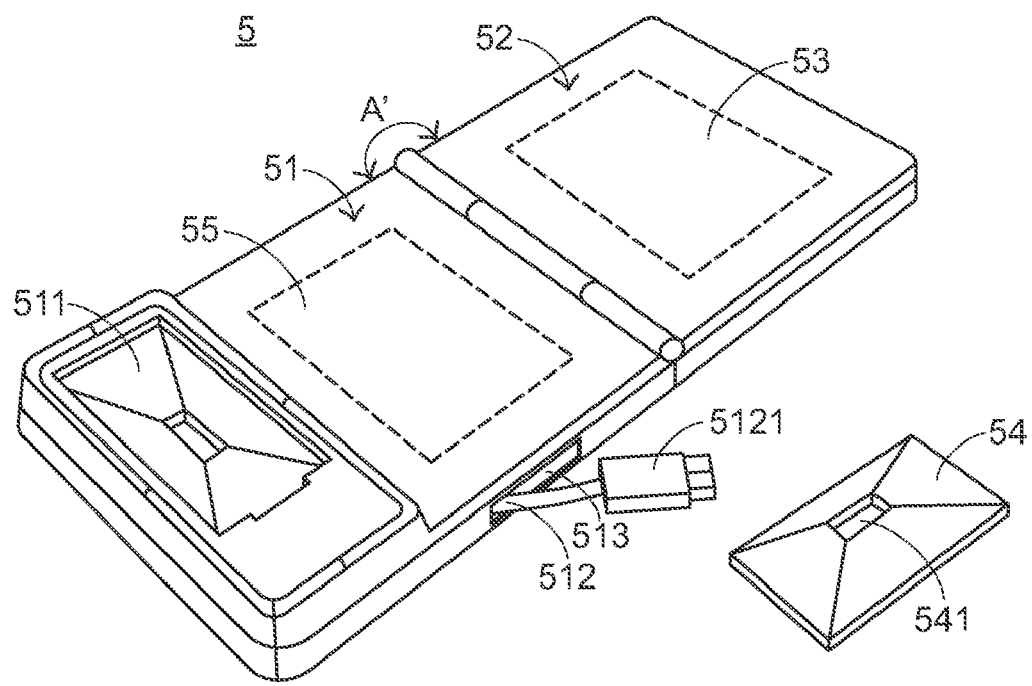
FIG. 5 is a schematic perspective view illustrating a wireless charging transmitter for a portable electronic device according to a second embodiment of the present invention, in which the wireless charging transmitter is in an unfolded status.
Figure 6:
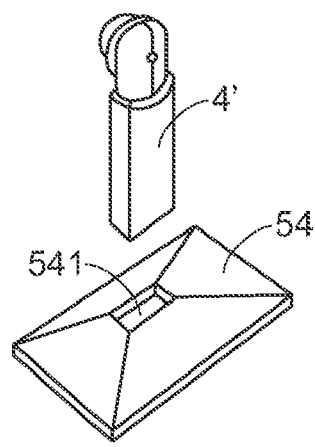
FIG. 6 is a schematic perspective view illustrating the relationship between the wireless charge receiving seat and the wirelessly-chargeable electronic device according to the second embodiment of the present invention.

Hereinafter, a second embodiment of the present invention will be illustrated with reference to FIGS. 5 and 6. FIG. 5 is a schematic perspective view illustrating a wireless charging transmitter for a portable electronic device according to a second embodiment of the present invention, in which the wireless charging transmitter is in an unfolded status. FIG. 6 is a schematic perspective view illustrating the relationship between the wireless charge receiving seat and the wirelessly-chargeable electronic device according to the second embodiment of the present invention. The wireless charging transmitter 5 comprises a first housing 51, a second housing 52, a first wireless charge transmitting module 53, a wireless charge receiving seat 54 and a second wireless charge transmitting module 55. The first housing 51 comprises a receptacle 511, a connecting wire 512 and a wire-receiving part 513. The wireless charge receiver 54 may be selectively accommodated within the receptacle 511. After the connecting wire 512 is connected with a power source (not shown), the electric power from the power source may be transmitted to the first wireless charge transmitting module 53 and the second wireless charge transmitting module 55 through the connecting wire 512. In addition, a connector 5121 is formed on a terminal of the connecting wire 512. Likewise, the connector 5121 is a universal series bus (USB) connector. The wire-receiving part 513 is arranged at a first side of the first housing 51 for accommodating the connecting wire 512.

The second housing 52 is connected with the first housing 51 and rotatable with respect to the first housing 51. Consequently, an included angle A' is defined between the second housing 52 and the first housing 51, or the second housing 512 and the first housing 51 are folded together. The first wireless charge transmitting module 53 is installed within the second housing 52. In a case that a wireless charging receiver 3 holding a portable electronic device 2 (see FIG. 3) is contacted with the second housing 52, first electric power may be transmitted from the first wireless charge transmitting module 53 to the wireless charging receiver 3. The second wireless charge transmitting module 55 is installed within the first housing 51. Similarly, in a case that the wireless charge receiving seat 54 is contacted with the first housing 51, second electric power may be transmitted from the second wireless charge transmitting module 55 to the wireless charge receiving seat 54. Through the wireless charge receiving seat 54, a wirelessly-chargeable electronic device 4' (see FIG. 6) may be wirelessly charged by the second electric power. Moreover, the wireless charge receiving seat 54 has an insertion slot 541. When a terminal of the wirelessly-chargeable electronic device 4' is inserted into the insertion slot 541, the wirelessly-chargeable electronic device 4' is fixed in the insertion slot 541. In this embodiment, the wirelessly-chargeable electronic device 4' is a wireless headset.

Figure 7:
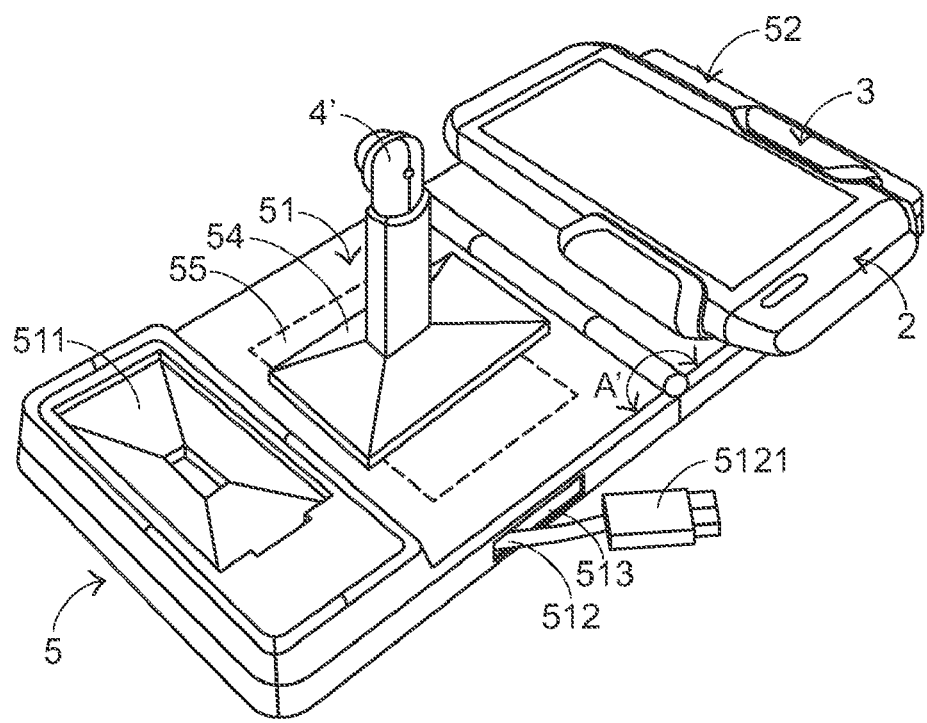
FIG. 7 is a schematic perspective view illustrating a system of transmitting electric power to the wireless charging receiver and the wirelessly-chargeable electronic device through the wireless charging transmitter according to the second embodiment of the present invention.

Hereinafter, the use of the wireless charging transmitter 5 to transmit electric power to the portable electronic device 2 will be illustrated with reference to FIG. 7. FIG. 7 is a schematic perspective view illustrating a system of transmitting electric power to the wireless charging receiver and the wirelessly-chargeable electronic device through the wireless charging transmitter according to the second embodiment of the present invention. For wirelessly charging the portable electronic device 2, the second housing 52 is rotated with respect to the first housing 51 until the second housing 52 is parallel with the first housing 51. Meanwhile, the included angle A' between the second housing 52 and the first housing 51 is equal to 180 degrees. In this situation, the wireless charging transmitter 5 is substantially a flat slab. Then, the wireless charging receiver 3 holding the portable electronic device 2 is contacted with the second housing 12. That is, the wireless charging receiver 3 is placed on the second housing 52. In such way, the first electric power may be transmitted from the first wireless charge transmitting module 53, which is installed within the second housing 52, to the wireless charging receiver 3 according to a wireless transmission technology. Then, the electric power is transmitted to the chargeable battery (not shown) of the portable electronic device 2 through the wireless charging receiver 3, thereby performing a wireless charging task.

In addition, the wireless charge receiving seat 54 holding the wirelessly-chargeable electronic device 4' is contacted with the first housing 51. That is, the wireless charge receiving seat 54 is placed on the first housing 51. In such way, the second electric power may be transmitted from the second wireless charge transmitting module 55, which is installed within the first housing 51, to the wireless charge receiving seat 54. Then, the second electric power is transmitted to portable electronic device 2 through the wireless charge receiving seat 54, thereby charging the wirelessly-chargeable electronic device 4'.

Alternatively, in some embodiments, a single wireless charge transmitting module is installed in the second housing, but the other wireless charge transmitting module is not include in the first housing. The circuitry of the single wireless charge transmitting module is distinguished from the first wireless charge transmitting module 53. That is, the single wireless charge transmitting module is configured to simultaneously transmit the first electric power and the second electric power. The first electric power is transmitted to the wireless charging receiver; and the second electric power is transmitted to the wireless charge receiving seat. Of course, the wireless charge receiving seat needs to be contacted with the second housing rather than the first housing. On the other hand, in the second embodiment, the first wireless charge transmitting module is included in the second housing and the second wireless charge transmitting module is included in the first housing.

Figure 8:
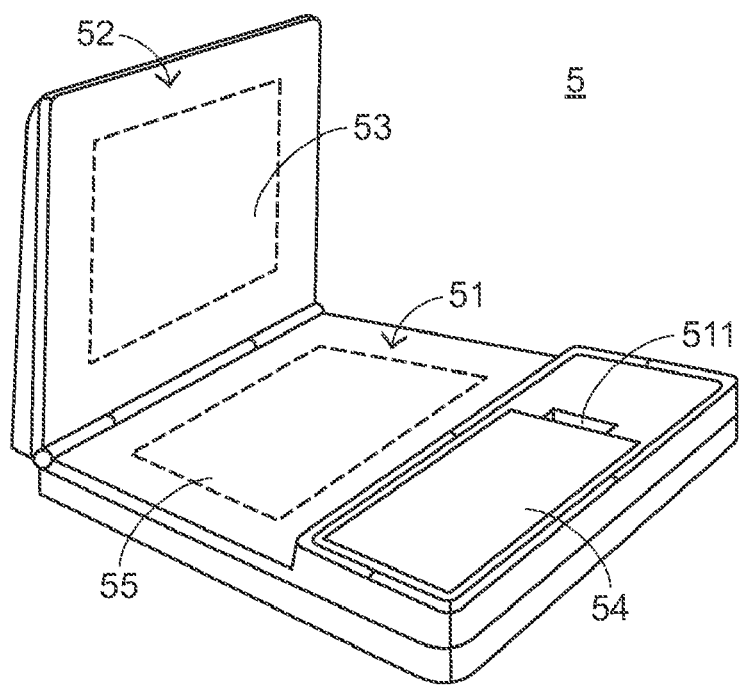
FIG. 8 is a schematic perspective view illustrating the wireless charging transmitter of FIG. 5, in which the wireless charge receiving seat is stored within the wireless charging transmitter.

FIG. 8 is a schematic perspective view illustrating the wireless charging transmitter of FIG. 5, in which the wireless charge receiving seat is stored within the wireless charging transmitter. After the wireless charging task is completed, the wireless charge receiving seat 54 may be accommodated within the receptacle 511 of the first housing 51. Then, by rotating the second housing 52 with respect to the first housing 51, the second housing 52 and the first housing 51 are folded together, so that the first housing 51 is sheltered by the second housing 52. In this situation, the wireless charging transmitter 5 has a rectangular shape. Due to the rectangular shape, the wireless charging transmitter 5 can be easily carried.

Figure 9:
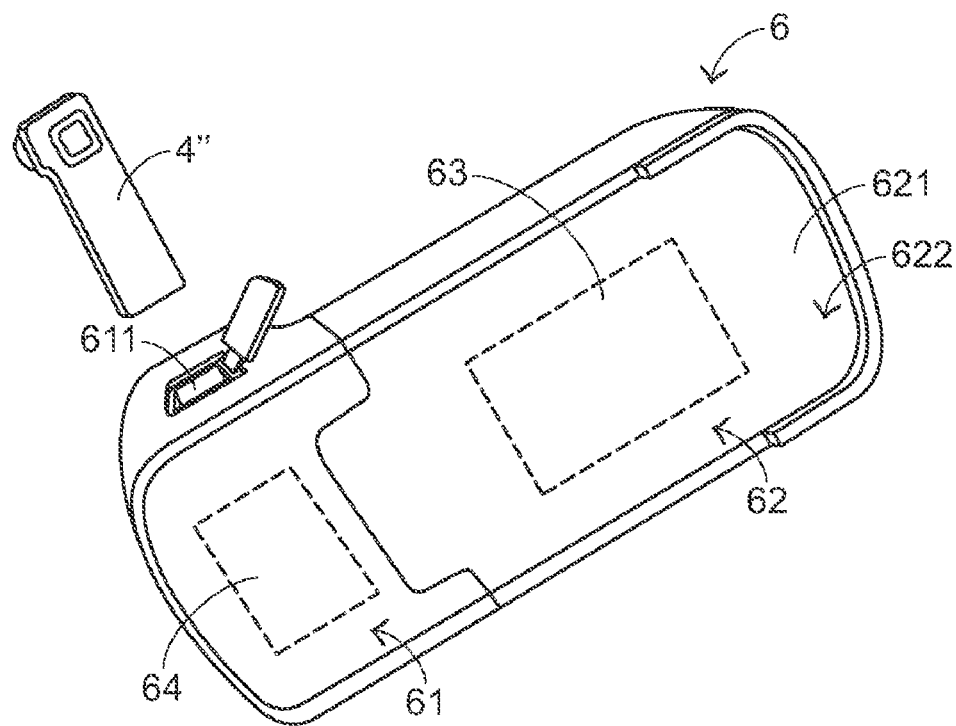
FIG. 9 is a schematic perspective view illustrating a wireless charging transmitter for a portable electronic device according to a third embodiment of the present invention.

FIG. 9 is a schematic perspective view illustrating a wireless charging transmitter for a portable electronic device according to a third embodiment of the present invention. As shown in FIG. 9, the wireless charging transmitter 6 comprises a first housing 61, a second housing 62, a first wireless charge transmitting module 63 and a second wireless charge transmitting module 64. The first housing 61 has an insertion slot 611, which is formed in a sidewall of the first housing 61. When a terminal of a wirelessly-chargeable electronic device 4" is inserted into the insertion slot 611, the wirelessly-chargeable electronic device 4" is fixed in the insertion slot 611. In this embodiment, the wirelessly-chargeable electronic device 4" is a wireless headset. The second housing 62 has a surface 621 and a receptacle 622. The receptacle 622 is formed in the surface 621 of the second housing 62. The first wireless charge transmitting module 63 is installed within the second housing 62. In a case that a wireless charging receiver 3 holding a portable electronic device 2 is contacted with the second housing 62 (see FIG. 11), the first electric power may be transmitted from the first wireless charge transmitting module 63 to the wireless charging receiver 3. The second wireless charge transmitting module 64 is installed within the first housing 61. In a case that the wirelessly-chargeable electronic device 4" is inserted into and fixed in the insertion slot 611, the second electric power may be transmitted from the second wireless charge transmitting module 65 to the wirelessly-chargeable electronic device 4" according to a wireless transmission technology.

Figure 10:
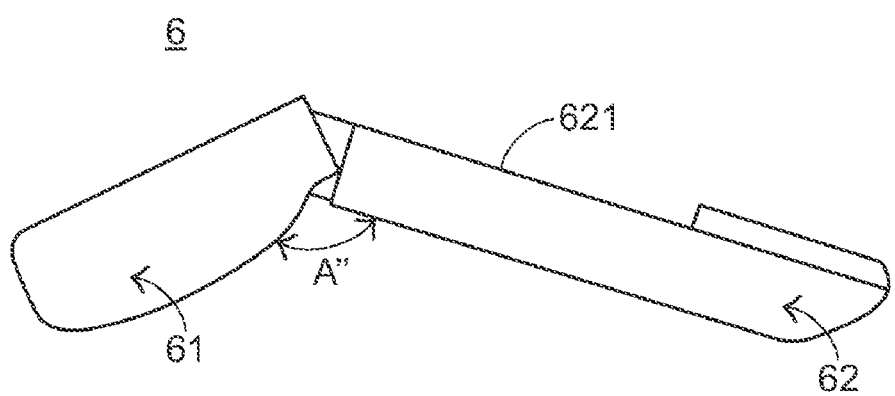
FIG. 10 is a schematic side view illustrating the wireless charging transmitter of FIG. 9 in a cambered status.

FIG. 10 is a schematic side view illustrating the wireless charging transmitter of FIG. 9 in a cambered status. The second housing 62 is connected with the first housing 61, and rotatable with respect to the first housing 61. In FIG. 9, the second housing 62 is parallel with the first housing 61, so that the wireless charging transmitter 6 is substantially a flat slab.

By rotating the second housing 62 with respect to the first housing 61, an included angle A" is defined between the second housing 62 and the first housing 61.

Figure 11:
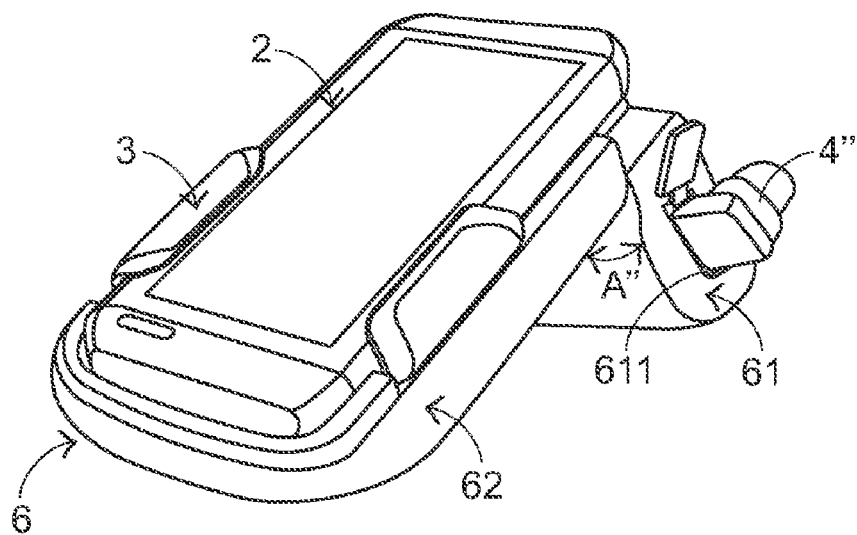
FIG. 11 is a schematic perspective view illustrating a system of transmitting electric power to the wireless charging receiver and the wirelessly-chargeable electronic device through the wireless charging transmitter according to the third embodiment of the present invention.

Hereinafter, the use of the wireless charging transmitter 6 to transmit electric power to the portable electronic device 2 will be illustrated with reference to FIG. 11. FIG. 11 is a schematic perspective view illustrating a system of transmitting electric power to the wireless charging receiver and the wirelessly-chargeable electronic device through the wireless charging transmitter according to the third embodiment of the present invention. For wirelessly charging the portable electronic device 2, the second housing 62 is rotated with respect to the first housing 61 until the included angle A" is defined between the second housing 62 and the first housing 61. The included angle A" is greater than 90 degrees, so that the wireless charging transmitter 6 has a cambered shape. Then, the wireless charging receiver 3 holding the portable electronic device 6 is contacted with the second housing 62. That is, the wireless charging receiver 3 is accommodated within the receptacle 622, which is formed in the surface 621 of the second housing 62. In such way, the electric power may be transmitted from the first wireless charge transmitting module 63, which is installed within the second housing 62, to the wireless charging receiver 3 according to a wireless transmission technology. Then, the electric power is transmitted to the chargeable battery (not shown) of the portable electronic device 2 through the wireless charging receiver 3, thereby performing a wireless charging task.

On the other hand, after the wirelessly-chargeable electronic device 4" is inserted into and fixed in the insertion slot 611 of the first housing 61, the wirelessly-chargeable electronic device 4" is contacted with the second wireless charge transmitting module 64, which is installed within the first housing 61. In such way, second electric power may be transmitted from the second wireless charge transmitting module 64 to the wirelessly-chargeable electronic device 4" according to a wireless transmission technology, thereby performing a wireless charging task.

As shown in FIG. 11, the wireless charging receiver 3 is accommodated within the receptacle 622 and the wirelessly-chargeable electronic device 4" is fixed in the insertion slot 611 of the first housing 61. Since the wireless charging receiver 3 is placed on the cambered-shaped wireless charging transmitter 6, the display screen of the portable electronic device 2 can be comfortably viewed during the charging process. Of course, in a case that the wireless charging transmitter 6 is in the flat slab status, the wireless charging receiver 3 may be accommodated within the wireless charging transmitter 6 to perform the wireless charging task.

Figure 12:
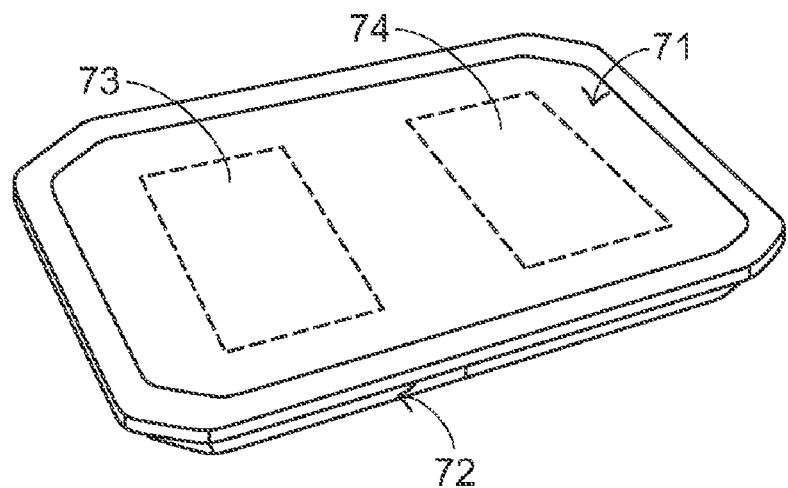
FIG. 12 is a schematic perspective view illustrating a wireless charging transmitter for a portable electronic device according to a fourth embodiment of the present invention.
Figure 13:
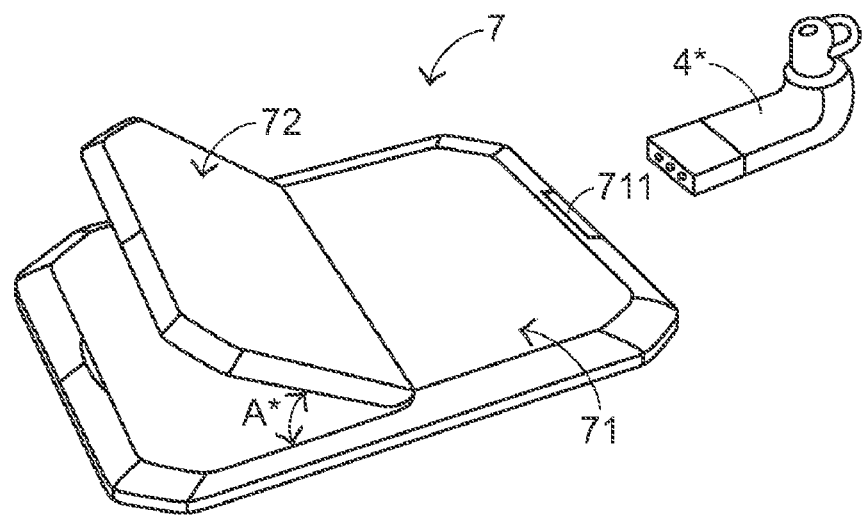
FIG. 13 is a schematic perspective view illustrating the wireless charging transmitter of FIG. 12 and taken along another viewpoint.

Hereinafter, a fourth embodiment of the present invention will be illustrated with reference to FIGS. 12 and 13. FIG. 12 is a schematic perspective view illustrating a wireless charging transmitter for a portable electronic device according to a fourth embodiment of the present invention. FIG. 13 is a schematic perspective view illustrating the wireless charging transmitter of FIG. 12 and taken along another viewpoint. The wireless charging transmitter 7 comprises a housing 71, a supporting stand 72, a first wireless charge transmitting module 73 and a second wireless charge transmitting module 74. The first housing 71 has an insertion slot 711, which is formed in a sidewall of the first housing 71. When a terminal of a wirelessly-chargeable electronic device 4* is inserted into the insertion slot 711, the wirelessly-chargeable electronic device 4* is fixed in the insertion slot 711. The supporting stand 72 is connected with the housing 71, and rotatable with respect to the housing 71. Consequently, an included angle A* is defined between the supporting stand 72 and the housing 71 (see FIG. 13), or the supporting stand 72 and the housing 71 are folded together (not shown). The first wireless charge transmitting module 73 is installed within the housing 71. In a case that a wireless charging receiver 3 holding a portable electronic device 2 is contacted with the housing 71 (see FIG. 14), the first electric power may be transmitted from the first wireless charge transmitting module 73 to the wireless charging receiver 3. The second wireless charge transmitting module 74 is also installed within the housing 71. In a case that the wirelessly-chargeable electronic device 4* is inserted into and fixed in the insertion slot 611, the second electric power may be transmitted from the second wireless charge transmitting module 74 to the wirelessly-chargeable electronic device 4* according to a wireless transmission technology.

Alternatively, in some embodiments, a single wireless charge transmitting module is installed in the housing, but the other wireless charge transmitting module is not include in the housing. The circuitry of the single wireless charge transmitting module is distinguished from the first wireless charge transmitting module 73. That is, the single wireless charge transmitting module is configured to simultaneously transmit the first electric power and the second electric power. The first electric power is transmitted to the wireless charging receiver; and the second electric power is transmitted to the wireless charge receiving seat. On the other hand, in the fourth embodiment, the first wireless charge transmitting module and the second wireless charge transmitting module are both included in the housing.

Figure 14:
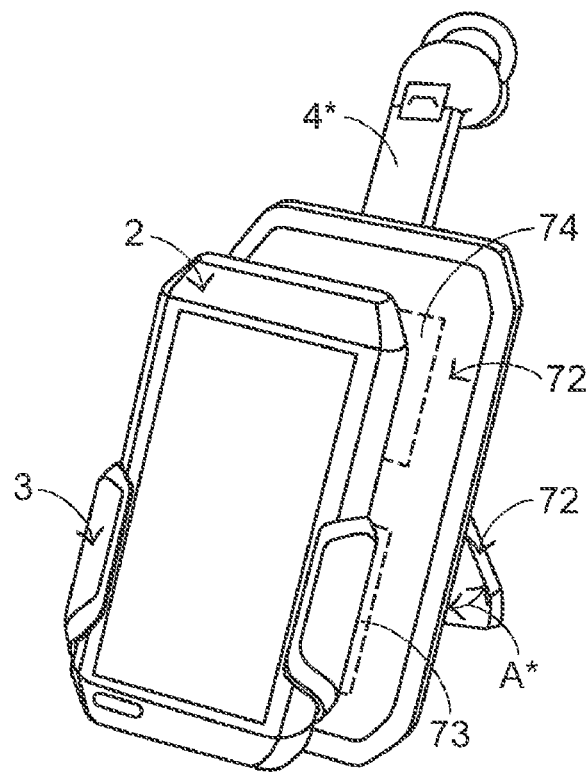
FIG. 14 is a schematic perspective view illustrating a system of transmitting electric power to the wireless charging receiver and the wirelessly-chargeable electronic device through the wireless charging transmitter according to the fourth embodiment of the present invention.

Hereinafter, the use of the wireless charging transmitter 7 to transmit electric power to the portable electronic device 2 will be illustrated with reference to FIG. 14. FIG. 14 is a schematic perspective view illustrating a system of transmitting electric power to the wireless charging receiver and the wirelessly-chargeable electronic device through the wireless charging transmitter according to the fourth embodiment of the present invention. For wirelessly charging the portable electronic device 2, the supporting stand 72 is rotated with respect to the housing 71, so that an included angle A* between the housing 71 and the supporting stand 72 is smaller than 90 degrees (i.e. an acute angle). In this situation, the wireless charging transmitter 7 has a shape of a photo frame. Then, the wireless charging receiver 3 holding the portable electronic device 2 is contacted with the housing 71. That is, the wireless charging receiver 3 is leant against the housing 71. In such way, the first electric power may be transmitted from the first wireless charge transmitting module 73, which is installed within the housing 71, to the wireless charging receiver 3 according to a wireless transmission technology. Then, the second electric power is transmitted to the chargeable battery (not shown) of the portable electronic device 2 through the wireless charging receiver 3, thereby performing a wireless charging task.

On the other hand, after the wirelessly-chargeable electronic device 4* is inserted into and fixed in the insertion slot 711 of the first housing 71, the wirelessly-chargeable electronic device 4* is contacted with the second wireless charge transmitting module 74, which is installed within the housing 71. In such way, second electric power may be transmitted from the second wireless charge transmitting module 74 to the wirelessly-chargeable electronic device 4* according to a wireless transmission technology, thereby performing a wireless charging task.

From the above description, the shape of the wireless charging transmitter is adjustable by changing the structural relationship between the first housing and the second housing (or the supporting stand). In such way, the user can view and operate the portable electronic device while performing the charging task. By the wireless charging transmitter of the present invention, the wireless charging receiver can be structurally and stably contacted with the wireless charging transmitter, thereby performing the wireless charging task.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging transmitter for a portable electronic device, said wireless charging transmitter being configured to transmit first electric power to a wireless charging receiver holding said portable electronic device, said wireless charging transmitter comprising:
   a first housing;
   a second housing connected with said first housing and rotatable with respect to said first housing, so that either an included angle is defined between said second housing and said first housing or said second housing and said first housing are folded together, wherein said second housing is contactable with said wireless charging receiver; and
   a first wireless charge transmitting module installed within said second housing, wherein when said wireless charging receiver is contacted with said second housing, said first electric power is transmitted from said first wireless charge transmitting module to said wireless charging receiver.

2. The wireless charging transmitter according to claim 1 further comprising a wireless charge receiving seat for fixing a wirelessly-chargeable electronic device, wherein when said wireless charge receiving seat is contacted with said first housing or said second housing, said first electric power from said first wireless charge transmitting module is received by said wireless charge receiving seat and transmitted to said wirelessly-chargeable electronic device, or second electric power from a second wireless charge transmitting module is received by said wireless charge receiving seat and transmitted to said wirelessly-chargeable electronic device.

3. The wireless charging transmitter according to claim 2 wherein said second wireless charge transmitting module is installed within said first housing, wherein when said wireless charge receiving seat is contacted with said first housing, said second electric power is transmitted from said second wireless charge transmitting module to said wireless charge receiving seat.

4. The wireless charging transmitter according to claim 3 wherein said wireless charge receiving seat has an insertion slot, wherein when a terminal of said wirelessly-chargeable electronic device is inserted into said insertion slot, said wirelessly-chargeable electronic device is fixed in said insertion slot and said wireless charge receiving seat is contacted with said wirelessly-chargeable electronic device, so that said second electric power is transmitted to said wirelessly-chargeable electronic device.

5. The wireless charging transmitter according to claim 2 wherein said second wireless charge transmitting module is installed within said second housing, wherein when said wireless charge receiving seat is contacted with said second housing, said second electric power is transmitted from said second wireless charge transmitting module to said wireless charge receiving seat.

6. The wireless charging transmitter according to claim 2 wherein said first housing further comprises a receptacle for accommodating said wireless charge receiving seat, wherein when said second housing and said first housing are folded together by rotating said second housing with respect to said first housing, said receptacle is sheltered by said second housing and said receptacle is not exposed outside said first housing.

7. The wireless charging transmitter according to claim 1 wherein said first housing further comprises:
   a connecting wire connected with a power source for transmitting said first electric power from said power source to said first wireless charge transmitting module; and
   a wire-receiving part formed in a sidewall of said first housing for accommodating said connecting wire.

8. The wireless charging transmitter according to claim 1 wherein said second housing further comprises a receptacle, which is formed in a surface of the second housing for accommodating said wireless charging receiver, wherein said first housing further comprises an insertion slot, which is formed in a sidewall of said first housing, wherein when a terminal of a wirelessly-chargeable electronic device is inserted into said insertion slot, said wirelessly-chargeable electronic device is fixed in said insertion slot.

9. A wireless charging transmitter for a portable electronic device, said wireless charging transmitter being configured to transmit first electric power to a wireless charging receiver holding said portable electronic device, said wireless charging transmitter comprising:
   a housing contactable with said wireless charging receiver;
   a supporting stand connected with said housing and rotatable with respect to said housing, so that either an included angle is defined between said supporting stand and said housing or said supporting stand and said housing are folded together; and
   a first wireless charge transmitting module installed within said housing, wherein when said wireless charging receiver is contacted with said housing, said first electric power is transmitted from said first wireless charge transmitting module to said wireless charging receiver.

10. The wireless charging transmitter according to claim 9 wherein said housing further comprises an insertion slot, which is formed in a sidewall of said housing, wherein when a terminal of a wirelessly-chargeable electronic device is inserted into said insertion slot, said wirelessly-chargeable electronic device is fixed in said insertion slot and said wirelessly-chargeable electronic device is contacted with said first wireless charge transmitting module, so that said first electric power is transmitted from said first wireless charge transmitting module to said wirelessly-chargeable electronic device.

11. The wireless charging transmitter according to claim 9 wherein said housing comprises:
   an insertion slot formed in a sidewall of said housing, wherein when a terminal of a wirelessly-chargeable electronic device is inserted into said insertion slot, said wirelessly-chargeable electronic device is fixed in said insertion slot; and
   a second wireless charge transmitting module installed within said housing, wherein when said wirelessly-chargeable electronic device is fixed in said insertion slot, said wirelessly-chargeable electronic device is contacted with said second wireless charge transmitting module, so that second electric power is transmitted from said second wireless charge transmitting module to said wirelessly-chargeable electronic device.

* * * * *